United States Patent
Hill et al.

(10) Patent No.: US 11,870,762 B2
(45) Date of Patent: Jan. 9, 2024

(54) MACSEC KEY EXCHANGE ATTRIBUTE REFLECTION FOR TRANSPARENT PROVIDER BACKBONE BRIDGE FORWARDING OVER PUBLIC ETHERNET PROVIDER BACKBONES

(71) Applicant: Cisco Technology Inc., San Jose, CA (US)

(72) Inventors: Craig Thomas Hill, Sterling, VA (US); Aaron Christopher Warner, Odessa, FL (US); Michael William Bessette, Reston, VA (US); Chennakesava Reddy Gaddam, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/368,902

(22) Filed: Jul. 7, 2021

(65) Prior Publication Data

US 2023/0008699 A1    Jan. 12, 2023

(51) Int. Cl.
*H04L 29/06* (2006.01)
*H04L 9/40* (2022.01)
*H04L 12/46* (2006.01)

(52) U.S. Cl.
CPC .......... *H04L 63/061* (2013.01); *H04L 12/462* (2013.01); *H04L 63/0464* (2013.01); *H04L 63/162* (2013.01)

(58) Field of Classification Search
USPC ......................................................... 713/171
See application file for complete search history.

(56) References Cited

U.S. PATENT DOCUMENTS

| | | | | |
|---|---|---|---|---|
| 2006/0234636 A1* | 10/2006 | Miller | ..................... | H04L 61/00 455/67.11 |
| 2008/0181243 A1* | 7/2008 | Vobbilisetty | ............ | H04L 45/20 370/406 |
| 2008/0209071 A1* | 8/2008 | Kubota | ............... | H04L 61/2596 709/238 |
| 2009/0207845 A1* | 8/2009 | Guan | ..................... | H04L 45/00 370/392 |
| 2009/0217032 A1* | 8/2009 | Guan | ..................... | H04L 63/08 380/279 |
| 2010/0271938 A1* | 10/2010 | Mutoh | .................... | H04L 69/40 370/228 |

(Continued)

*Primary Examiner* — Sanchit K Sarker
(74) *Attorney, Agent, or Firm* — Baker Botts L.L.P.

(57) ABSTRACT

The present disclosure is directed to systems and methods for transparent Provider Backbone Bridge forwarding of MACsec key exchanges over public Ethernet provider backbones. The method includes the steps of receiving, at a first PBB device, an Ethernet frame from a first edge router for transmission to a second edge router via a MACsec connection, the Ethernet frame comprising a plurality of fields; performing a lookup of one or more fields of the plurality of fields to determine a match with one or more pre-defined values; determining that the one or more fields of the Ethernet frame match the one or more pre-defined values; rewriting the one or more fields of the Ethernet frame to one or more open values operable to allow the Ethernet frame to be transmitted to a next hop device; and transmitting the Ethernet frame to the next hop device.

17 Claims, 3 Drawing Sheets

(56) References Cited

U.S. PATENT DOCUMENTS

| | | | |
|---|---|---|---|
| 2013/0121150 A1* | 5/2013 | Sajassi | H04L 12/4662 |
| | | | 370/235 |
| 2017/0195135 A1* | 7/2017 | Singh | H04L 45/745 |
| 2019/0191307 A1 | 6/2019 | Sheng et al. | |
| 2019/0386824 A1 | 12/2019 | Adiga et al. | |
| 2020/0259834 A1 | 8/2020 | Hussain et al. | |
| 2020/0389469 A1 | 12/2020 | Litichever et al. | |

* cited by examiner

MACSEC KEY EXCHANGE ATTRIBUTE REFLECTION FOR TRANSPARENT PROVIDER BACKBONE BRIDGE FORWARDING OVER PUBLIC ETHERNET PROVIDER BACKBONES

TECHNICAL FIELD

The present disclosure generally relates to Provider Backbone Bridges (PBBs), and more specifically to systems and methods for MACsec key exchange attribute reflection for transparent provider backbone bridge (PBB) forwarding over public ethernet provider backbones.

BACKGROUND

WAN MACsec provides a line rate network encryption solution over Layer 2 Ethernet transport services. MACsec may be deployed outside of conventional campus networks, whether over Metro Ethernet transport or Data Center Interconnect (DCI) links, and may be used to secure WAN connections that leverage Ethernet as the link-layer media.

DESCRIPTION OF EXAMPLE EMBODIMENTS

Overview

Figure 1:
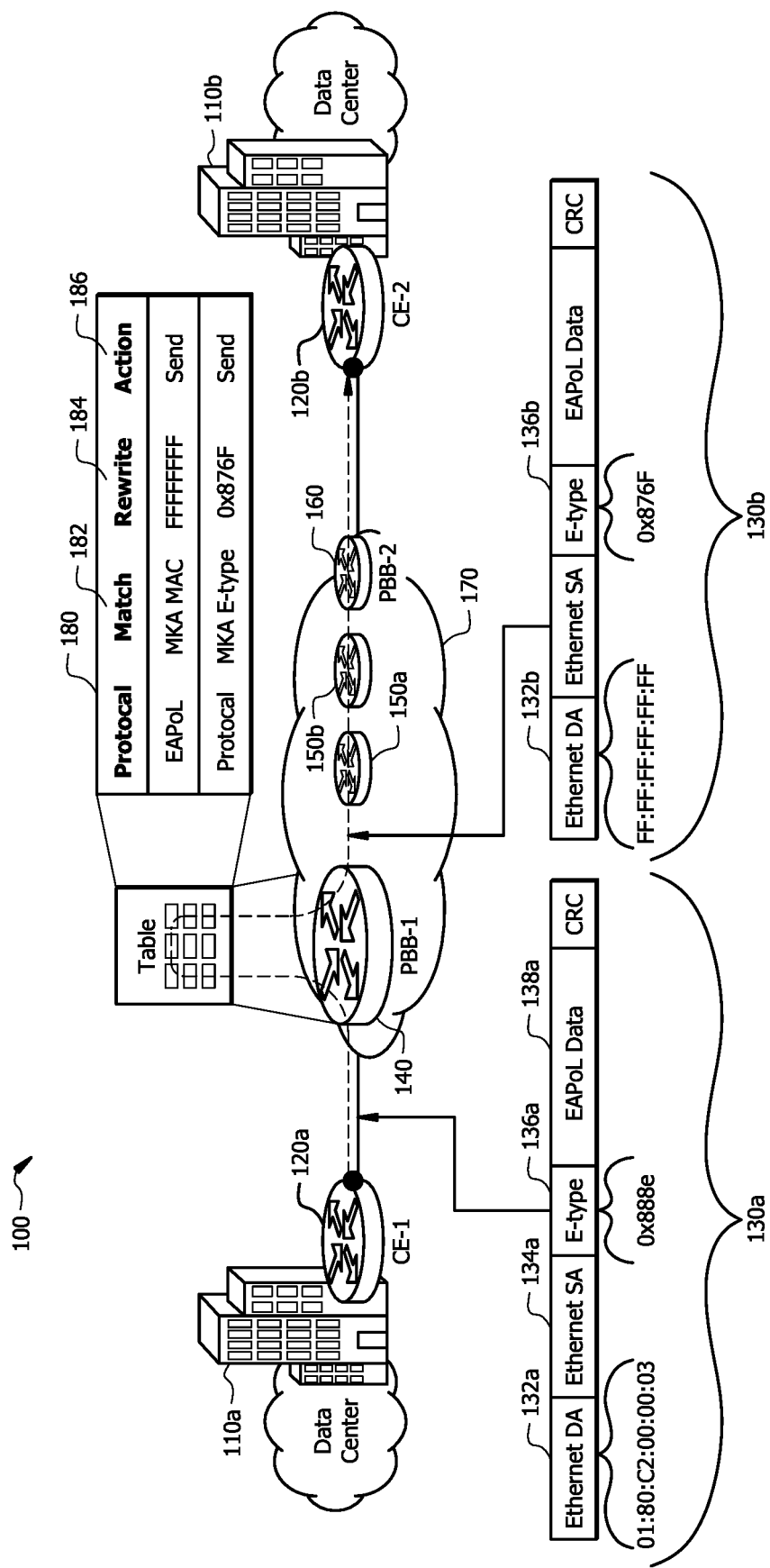
FIG. 1 illustrates a system for transparent Provider Backbone Bridge (PBB) forwarding of MACsec key exchanges over public Ethernet provider backbones, in accordance with certain embodiments.

According to an embodiment, a system may include one or more processors and one or more computer-readable non-transitory storage media comprising instructions that, when executed by the one or more processors, cause one or more components of the system to perform operations including, receiving, at a first PBB device, an Ethernet frame from a first edge router, the Ethernet frame configured for transmission to a second edge router via a Media Access Control security (MACsec) connection and comprising a plurality of fields; performing a lookup of one or more fields of the plurality of fields of the Ethernet frame to determine a match with one or more pre-defined values; determining that the one or more fields of the Ethernet frame match the one or more pre-defined values; rewriting the one or more fields of the Ethernet frame to one or more open values, the one or more open values operable to allow the Ethernet frame to be transmitted to a next hop device; and transmitting the Ethernet frame to the next hop device.

Moreover, the first edge router may be engaged in a MACsec key exchange with the second edge router.

Additionally, the one or more fields may comprise at least one of the following: an Ethernet destination address field; or an Ether-type field. The Ethernet destination address field may comprise a value corresponding to 01:80:C2:00:00:03. The Ether-type field may comprise a value corresponding to 0x888e.

Moreover, the operation of rewriting the one or more fields may be configured by policy on the first PBB device. Also, the rewritten one or more fields of the Ethernet frame may be operable to be modified to their original values at a second PBB device associated with the second edge router.

According to another embodiment, a method may include the steps of receiving, at a first PBB device, an Ethernet frame from a first edge router, the Ethernet frame configured for transmission to a second edge router via a Media Access Control security (MACsec) connection and comprising a plurality of fields; performing a lookup of one or more fields of the plurality of fields of the Ethernet frame to determine a match with one or more pre-defined values; determining that the one or more fields of the Ethernet frame match the one or more pre-defined values; rewriting the one or more fields of the Ethernet frame to one or more open values, the one or more open values operable to allow the Ethernet frame to be transmitted to a next hop device; and transmitting the Ethernet frame to the next hop device.

According to yet another embodiment, one or more computer-readable non-transitory storage media may embody instructions that, when executed by a processor, cause the performance of operations, including receiving, at a first PBB device, an Ethernet frame from a first edge router, the Ethernet frame configured for transmission to a second edge router via a Media Access Control security (MACsec) connection and comprising a plurality of fields; performing a lookup of one or more fields of the plurality of fields of the Ethernet frame to determine a match with one or more pre-defined values; determining that the one or more fields of the Ethernet frame match the one or more pre-defined values; rewriting the one or more fields of the Ethernet frame to one or more open values, the one or more open values operable to allow the Ethernet frame to be transmitted to a next hop device; and transmitting the Ethernet frame to the next hop device.

Technical advantages of certain embodiments of this disclosure may include one or more of the following. The systems and methods described herein may allow customer edge devices to send the necessary MKA key exchange messages within their standard MAC-address and Ether-type values to PBB devices. The PBB devices may determine a match with pre-defined values. By policy, if a PBB device determines a match, the PBB device may perform a "rewrite" function to encode those values to an open and unknown value, thereby allowing all PBB's downstream to forward these frames as uninteresting in their standard bridging process.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

WAN MACsec allows for authentication and encryption of traffic over Layer 2 Ethernet transport services, and may be leveraged outside campus networks, including over Metro Ethernet transport or Data Center Interconnect (DCI) links. In order to establish a secure MACsec session between peers, MACsec Key Agreement (MKA) control protocol is used to select the cipher suite for encryption and exchange the required keys and parameters between the peers. MKA uses Extensible Authentication Protocol (EAP) over LAN (EAPoL) as a transport protocol to transmit MKA messages.

By default, EAPoL uses a destination multicast MAC address of 01:80:C2:00:00:03 to multicast frames to multiple destinations.

For enterprise customers having on-premises edge devices and utilizing a public Metro Ethernet Service to connect with peers, the complexity arises when the messages are transmitted through intermediate Provider Backbone Bridge (PBB) devices, as inconsistent or undesirable approaches are taken by service providers on the PBB devices. Specifically, when PBB devices receive certain Ethernet frames for MACsec key exchange, e.g., including the MAC-address and Ether-type associated with MKA encapsulation to establish secure MACsec sessions, PBB devices by default often block the frames rather than forwarding them to their intended destination. This may occur with certain well-known MAC-addresses (e.g., 01:80:C2:00:00:03) and Ether-types (e.g., 0x888e) that are used for other communications, such as IEEE 802.1X. Thus, when two MACsec routers attempt to negotiate a MACsec session over MKA/EAPoL, a PBB device supporting the Ethernet transport may identify the well-known values of the Ethernet frame, and, in accordance with PBB logic and/or policies configured within the PBB, may determine that the frame is intended for the PBB itself and may consume or drop the frame. As a result, key establishment between the two MACsec endpoints is unsuccessful as the MKA frame sent for key negotiation never arrived to the destination endpoint.

The present invention is directed to a mechanism that allows for the modification of the EAPoL destination MAC-address and Ether-Type to avoid MKA protocol frames being consumed by intermediate PBB devices. Specifically, the present disclosure provides a mechanism for a PBB to interpret the default MACsec/MKA key exchange encoding within an EAPoL frame (e.g., MAC-address 01:80:C2:00:00:03, Ether-type 0x888e), and execute a "rewrite" function of that critical frame to "standard-but-unknown" values, thereby allowing the EAPoL MKA frame to be transparently forwarded through the PBB network and avoiding the default behavior of dropping the frame in the MACsec/MKA key exchange process over a public Ethernet network.

FIG. 1 depicts a system 100 for transparent Provider Backbone Bridge (PBB) forwarding of MACsec key exchanges over public Ethernet provider backbones, in accordance with the present disclosure. System 100 may include an enterprise network with a plurality of enterprise locations having on-premises customer edge routers (referred to generally as "edge routers"). By way of example, FIG. 1 shows a first enterprise location 110a having a first edge router 120a associated therewith and a second enterprise location 110b having a second edge router 120b associated therewith. Although the present disclosure may describe the system 100 as comprising an enterprise network having enterprise locations operable for communication exchanges therebetween, it is to be understood that the system 100 may comprise any network in which a customer of any entity, e.g., federal, financial, cloud provider, and the like, may desire to form a secure connection over Ethernet. Moreover, although the system 100 is described in conjunction with edge routers, it is to be understood that the system may comprise any router, switch or other device that is MACsec-capable and operable to initiate and/or establish a secure connection with a peer device.

The system 100 may further include one or more PBB devices. FIG. 1 shows a first PBB device 140 that is communicably coupled to the first edge router 120a, and a second PBB device 160 that is communicably coupled to the second edger router 120b. A plurality of intermediate PBB devices 150a, 150b may serve as intermediate hops between the first PBB device 140 and the second PBB device 160. The PBB devices of FIG. 1 may comprise routers, switches, or other device operable to complete the MACsec secured path between the first edge router 120a and the second edge router 120b.

In operation, the first edge router 120a may desire to establish a MKA MACsec session with the second edge router 120b. For edge routers running MACsec, the first order in establishing the session is to conduct key exchanges through the use of EAPoL. The path of the session, and these key changes, may run through one or more service provider owned routers or bridges 170, including the first PBB device 140, intermediate PBB devices 150a, 150b, and the second PBB device 160. The path of the MKA session is delineated in FIG. 1 by the dotted lines between the first edge router 120a and the second edge router 120b. The first and second edge routers 120a, 120b may utilize a public Metro Ethernet Service to perform a MKA key exchange with one another, and may secure these connections using MACsec protocol. As part of the MKA key exchange, the first edge router 120a may initiate the communication by sending an Ethernet frame 130a to the first PBB device 140. As known in the art, the Ethernet frame 130a may comprise a plurality of fields, including an Ethernet Destination Address 132a, an Ethernet Source Address 134a, Ether-Type 136a, EAPoL Data 138a, etc., with the Ethernet Destination Address 132a and the Ether-type 136a being particularly relevant for purposes of the present disclosure. In an embodiment, the Ethernet Destination Address 132a and the Ether-type 136a may comprise the well-known values of the MKA key exchange, e.g., 01:80:C2:00:00:03 and 0x888e, respectively, although it is to be understood that the scope of the present disclosure is not necessarily limited to these values and that the mechanism of the present disclosure may be adapted for any field and/or associated value of the Ethernet frame 130a.

The first PBB device 140 may receive the Ethernet frame 130a from the first edge router. As discussed above, the Ethernet frame 130a is configured for transmission to the second edge router 120b via a MACsec connection and comprises a plurality of fields. Upon receipt of the Ethernet frame, the first PBB device 140 may perform a lookup of the Ethernet Destination Address 132a and/or the Ether-type 136a of the Ethernet frame 130a to determine if the values of these fields match one or more pre-defined values that are stored within the logic of the first PBB device 140. As shown in FIG. 1, the first PBB device 140 may store a lookup table 180 indicating match parameters 182, rewrite parameters 184, and associated actions 186. Specifically, based on the lookup, if the first PBB device 140 determines that the Ethernet Destination Address 132a and the Ether-type 136a of the Ethernet frame 130a matches the pre-defined values stored in the lookup table 180, then in accordance with configured policy (i.e., policy pre-configured within the first PBB device 140), the first PBB device 140 may execute a rewrite function to rewrite the Ethernet Destination Address 132a and/or the Ether-type 136a to open or unknown values that are operable to allow the Ethernet frame to be transmitted along the path of the MKA session, rather than be consumed. The lookup table 180 may also expressly indicate that first PBB device 140 is to take an associated action 186, i.e., by sending the Ethernet frame to its next hop destination.

As shown in FIG. 1, in response to a match in the lookup table 180, the Ethernet frame 130a may be updated by a rewrite. The Ethernet frame 130b (referred to hereafter as the updated Ethernet frame 130b) depicts the fields after the rewrite has been completed. In particular, after the rewrite, the Ethernet Destination Address 132*b* is FF:FF:FF:FF:FF:FF and the Ether-type 136*b* is 0x876F. These particular values comprise known bridging values that are universally supported by PBBs. Thus, once the rewrite is complete, the Ethernet frame 130*b* is operable to be transmitted to the appropriate next hop device in the path of the MKA session. In the example of FIG. 1, the first PBB device 140 may transmit the updated Ethernet frame 130*b* to an intermediate PBB device 150*a*, which may in turn transmit the Ethernet frame 130*b* to another intermediate device 150*b*, before it is transmitted to the second PBB device 160 associated with the second edge router 120*b*. While two intermediate PBB devices 150*a*, 150*b* are shown in FIG. 1, it is to be understood that the system 100 may include any number of intermediate PBB devices in the bridge between the first edge router 120*a* and the second edge router 120*b*. At each intermediate PBB device 150*a*, 150*b*, a lookup may be performed to determine the action to be taken with respect to the received Ethernet frame 130*b*. Since the relevant fields of the Ethernet frame 130*b* have been updated to open or unknown values, as described above, each intermediate PBB device 150*a*, 150*b* will transmit the updated Ethernet frame 130*b* to the next hop in the path of the MKA session, until the updated Ethernet frame 130*b* arrives at the second PBB device 160.

Once the Ethernet frame 130*b* arrives at the second PBB device 160 (i.e., the PBB device that is to transmit the Ethernet frame to the second edge router 120*b*), by policy configured on the second PBB device 160, the second PBB device 160 may rewrite the updated Ethernet frame 130*b* back to its original values. In other words, the Ethernet Destination Address 132*b* may be rewritten to 01:80:C2:00:00:03 and the Ether-type 136*b* may be rewritten to 0x888e. Then, the Ethernet frame may be transmitted to its intended destination at the second edge router 120*b*. In this manner, the present disclosure provides a mechanism to circumvent the default behavior of PBB devices, i.e., the dropping or consuming of Ethernet frames if it is determined the frame is not intended for the transit bridge.

The mechanisms disclosed in the present disclosure may be applied to various use cases. For example, the problem described above may also be seen in certain enterprise data center scenarios. Suppose an enterprise has a requirement to deploy MACsec between a first virtual machine and a second virtual machine in a data center deployed in a spine and leaf architecture. In other words, a series of leaves and spines may connect the first and second virtual machines. The first virtual machine may transmit an Ethernet frame to a first leaf for transmission to the second virtual machine, the first leaf responsible to transmit the Ethernet frame to a next hop in the path of the MKA session through the spine and leaf architecture. If the MKA fields of the Ethernet frame (e.g., the Ethernet Destination Address and the Ether-type) are not destined for use by the first leaf, the first leaf may drop the frame mid-stream, preventing it from being forwarded to the second virtual machine. The result is an MKA failure between the first and second virtual machines. Thus, in accordance with the present disclosure, in the same manner that the first PBB device was configured by policy to perform a match and conduct a rewrite, the first leaf may be configured by policy to determine a match on the Ethernet destination address and Ether-type, rewrite the fields, and allow the frame be transmitted through the network to the second virtual machine.

A second use case, may be seen when attempting to establish a MACsec connection between a server and a WAN device deployed in a spine and leaf architecture, where a series of leaves and spines connect the server and the WAN device, similar to the virtual machine scenario above. By way of example, the server may transmit an Ethernet frame to a first leaf for transmission to the WAN device. If the MKA fields of the Ethernet frame (e.g., the Ethernet Destination Address and the Ether-type) are not destined for use by the first leaf, the first leaf may drop the frame mid-stream, preventing it from being forwarded to the WAN device. Again, the first leaf may be configured by policy to determine a match on the Ethernet destination address and Ether-type, rewrite the fields to open values, and allow the frame be transmitted through the network to the WAN device. In situations, e.g., multitenant environments, where hop-by-hop encryption may not be desirable and end-to-end encryption is preferred, the present disclosure offers a solution for communities of interest that are relevant to a tenant to establish MACsec connections.

Another use case may relate to secure defense networks, where the requirement for usage of government-furnished Ethernet encryption devices requires an Ethernet transport to support connectivity. These encryption devices leverage standard MKA key parameters (including MAC destination address/Ether-type) and succumb to the same challenges as commercial off-the-shelf MACsec when it comes to dealing with well-known MAC/Ether-type values. As such, it is vital that the PBB in the carrier Ethernet backbone support the ability to forward those Ethernet frames to the destination encryption device, enabling the devices to operate seamlessly across the network.

Figure 2:
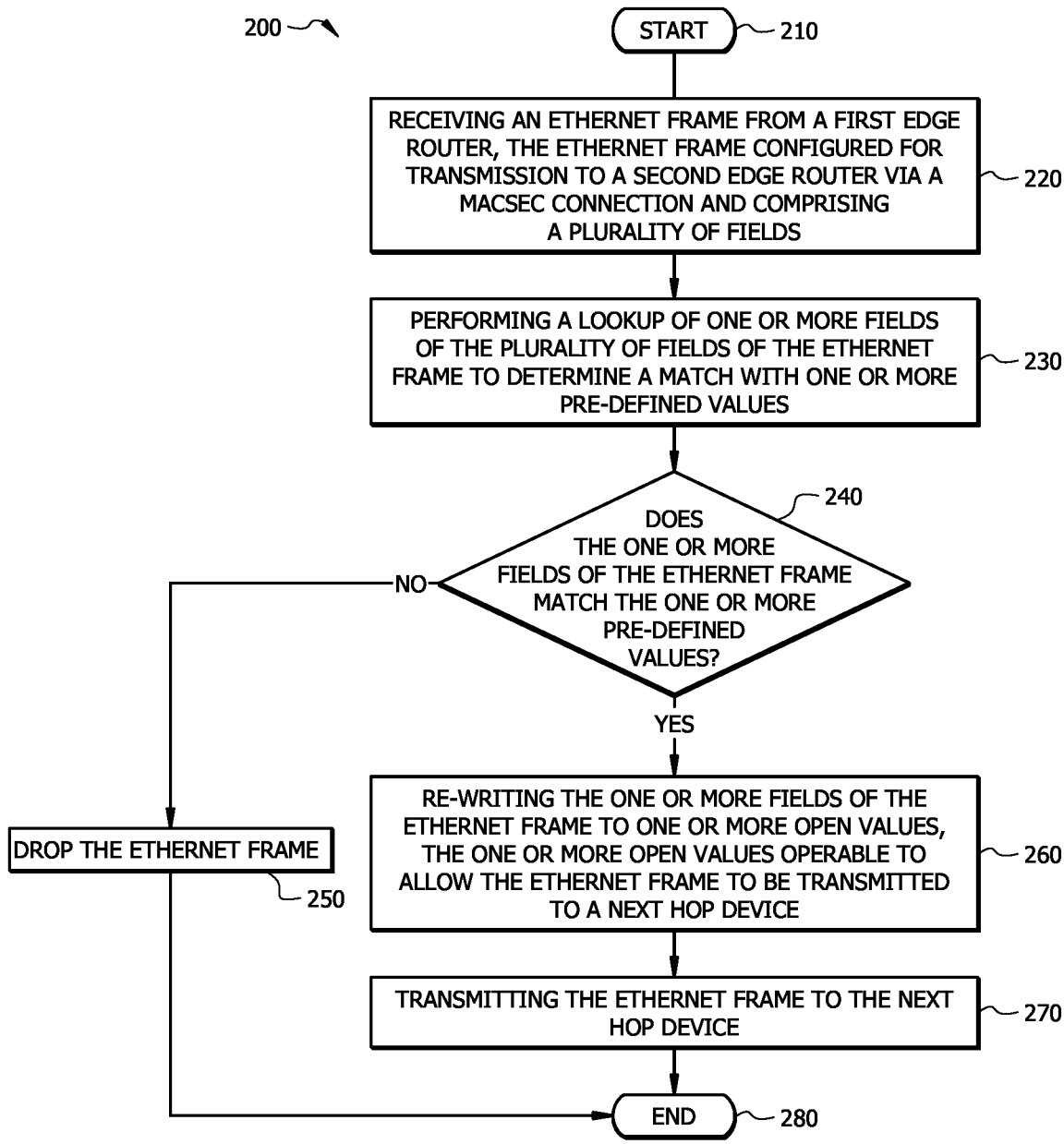
FIG. 2 illustrates a flow diagram of a method for transparent Provider Backbone Bridge (PBB) forwarding of MACsec key exchanges over public Ethernet provider backbones, in accordance with certain embodiments.

Reference is now made to FIG. 2, wherein is shown a flow diagram of a method 200 for transparent PBB forwarding of MACsec key exchanges over public Ethernet provider backbones, in accordance with the present disclosure. The steps of method 200 may be in accord with the operations outlined in conjunction with the system 100 of FIG. 1. As such, similar and corresponding terms described in conjunction with FIG. 1 may have the same meaning when used in conjunction with the method 200 of FIG. 2. Additionally, the present disclosure incorporates by reference the description of FIG. 1 for the purposes of explaining, expounding upon, or otherwise clarifying the steps of method 200.

In an embodiment, the steps of method 200 presume a scenario in which a first edge router seeks to establish a MACsec connection for performing a MACsec key exchange with a second edge router. The MACsec connection may comprise a MKA session through EAPoL, in which a secured path is formed between the first edge router and the second edge router. The first and second edge routers may utilize a public Metro Ethernet Service to perform the MKA key exchange with one another, and may secure these connections using MACsec protocol. The secured path may traverse through one or more PBB devices. Although the method 200 is described in conjunction with first and second edge routers, it is to be understood that the present disclosure is not limited to communications between edge routers, and may be applied in any scenario in which encryption and key exchange is required between two devices over a public Ethernet provider backbone. In an embodiment, the two devices may comprise any type of router, switch or other device that is MACsec-capable and operable to initiate and/or establish a secure connection with a peer device. Thus, for purposes of illustration and not by limitation, first and second edge routers are described.

The method 200 may be performed in a network having one or more service provider owned bridges or PBB devices. The PBB devices may comprise routers, switches, or other device operable to complete the MACsec secured path between the first edge router and the second edge router. The method 200 may be performed from the perspective of a first PBB device in a path associated with an MKA session established by the first edge router. However, it is to be understood that method 200 may be adapted such as to be performed by any component, element, or module in the, without departing from the spirit or scope of the present disclosure.

The method may begin at step 210. At step 220, the first PBB device may receive an Ethernet frame from a first edge router, the Ethernet frame configured for transmission to a second edge router via a MACsec connection and comprising a plurality of fields. As known in the art, the Ethernet frame may comprise a plurality of fields, including an Ethernet Destination Address, an Ethernet Source Address, Ether-Type, EAPoL Data, etc. For purposes of method 200, the Ethernet Destination Address and the Ether-type are particularly relevant. In an embodiment, the Ethernet Destination Address and the Ether-type may comprise the well-known values of the MKA key exchange, e.g., 01:80:C2:00:00:03 and 0x888e, respectively, although it is to be understood that the scope of the present disclosure is not necessarily limited to these values and that the mechanism of the present disclosure may be adapted for any field and/or associated value of the Ethernet frame.

At step 230, the first PBB device may perform a lookup of one or more fields of the plurality of fields of the Ethernet frame to determine a match with one or more pre-defined values that are stored within the logic of the first PBB device. The first PBB device may store a lookup table indicating match parameters, rewrite parameters, and associated actions (e.g., send/transmit, drop/consume, etc.). These values may be pre-configured in the lookup table on the first PBB device by policy. Specifically, based on the lookup, if the first PBB device determines that the Ethernet Destination Address and the Ether-type of the Ethernet frame matches the pre-defined values stored in the lookup table, then in accordance with the configured policy, the first PBB device may execute a rewrite function to rewrite the Ethernet Destination Address and/or the Ether-type to open or unknown values that are operable to allow the Ethernet frame to be transmitted along the path of the MKA session, rather than be consumed. The lookup table may also expressly indicate that first PBB device is to take an associated action, i.e., by sending the Ethernet frame to its next hop destination.

At step 240, the first PBB device may determine if the one or more fields of the Ethernet frame match the one or more pre-defined values. If at step 240, the first PBB device determines that the one or more fields of the Ethernet frame do not match the one or more pre-defined values, the method may proceed to step 250, wherein the first PBB device may consume or drop the Ethernet frame.

If, however, at step 240, the first PBB device determines that the one or more fields of the Ethernet frame do match the one or more pre-defined values, the method may proceed to step 260, wherein the first PBB device may rewrite the one or more fields of the Ethernet frame to one or more open values, the one or more open values operable to allow the Ethernet frame to be transmitted to a next hop device. In particular, after the rewrite, the Ethernet Destination Address may be FF:FF:FF:FF:FF:FF and the Ether-type may be 0x876F. These particular values comprise known bridging values that are universally supported by PBBs. Thus, once the rewrite is complete, the Ethernet frame is operable to be transmitted to the appropriate next hop device in the path of the MKA session.

At step 270, the first PBB device may transmit the Ethernet frame to the next hop device. The first PBB device may transmit the updated Ethernet frame to an intermediate PBB device, which may in turn transmit the Ethernet frame to another intermediate device, before it is transmitted to the second PBB device associated with the second edge router. It is to be understood that any number of intermediate PBB devices may be present in the bridge between the first edge router and the second edge router. At each intermediate PBB device a lookup may be performed to determine the action to be taken with respect to the received Ethernet frame. Since the relevant fields of the Ethernet frame have been updated to open or unknown values, as described above, each intermediate PBB device may transmit the updated Ethernet frame to the next hop in the path of the MKA session, until the updated Ethernet frame arrives at the second PBB device (i.e., the PBB device that is to transmit the Ethernet frame to the second edge router).

Once the Ethernet frame arrives at the second PBB device, by policy configured on the second PBB device, the second PBB device may rewrite the updated Ethernet frame back to its original values. In other words, the Ethernet Destination Address may be rewritten to 01:80:C2:00:00:03 and the Ether-type may be rewritten to 0x888e. Then, the Ethernet frame may be transmitted to its intended destination at the second edge router. At step 280, the method 200 may end.

In sum, the systems and methods of the present disclosure may allow for unique capability that leverages MACsec over the top of the public carrier Ethernet provider's network. By enabling a MAC-Address/Ether-type "rewrite" functionality, the present disclosure provides a simplified configuration which allows the PBB device to be transparent to the client, thereby increasing MACsec adoption. By rewriting the MAC-Address/Ether-type value to an "open" or "not well-known" value, security may be maintained across the backbone, while still connecting MACsec endpoints over multiple hops. This capability may also allow for PBB's to operate in a Layer 2 capacity.

Figure 3:
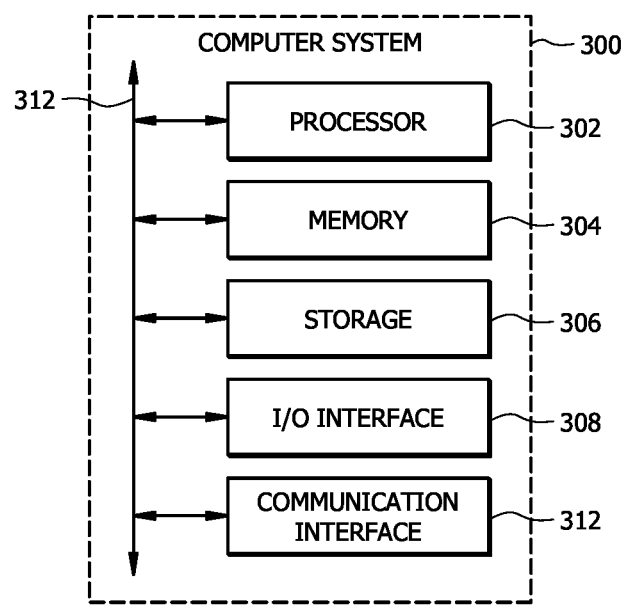
FIG. 3 illustrates a computer system, in accordance with certain embodiments.

Reference is now made to FIG. 3, wherein is shown an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors;
one or more computer-readable non-transitory storage media comprising instructions that, when executed by the one or more processors, cause one or more components of the system to perform operations comprising:
receiving, at a first provider backbone bridge (PBB) device, an Ethernet frame from a first edge router, the Ethernet frame configured for transmission to a second edge router via a Media Access Control security (MACsec) connection and comprising an Ether-type field;
performing, by the first PBB device, a lookup of the Ether-type field of the Ethernet frame to determine a match with one or more pre-defined values;
determining, by the first PBB device, that the Ether-type field of the Ethernet frame matches the one or more pre-defined values;
rewriting, by the first PBB device, the Ether-type field of the Ethernet frame to an open value, the open value operable to allow the Ethernet frame to be transmitted to a next hop device;
transmitting, by the first PBB device, the rewritten Ethernet frame to the next hop device; and
performing, by the next hop device, a lookup of the Ether-type field of the rewritten Ethernet frame to determine a next action.

2. The system of claim 1, wherein the first edge router is engaged in a MACsec key exchange with the second edge router.

3. The system of claim 1, wherein rewriting the Ether-type field further comprises rewriting the Ether-type field to a value corresponding to 0x876F.

4. The system of claim 1, wherein the Ether-type field comprises a value corresponding to 0x888e.

5. The system of claim 1, wherein the operation of rewriting the Ether-type field is configured by policy on the first PBB device.

6. The system of claim 1, wherein the rewritten Ether-type field of the Ethernet frame is operable to be modified to its original value at a second PBB device associated with the second edge router.

7. A method, comprising:
receiving, at a first provider backbone bridge (PBB) device, an Ethernet frame from a first edge router, the Ethernet frame configured for transmission to a second edge router via a Media Access Control security (MACsec) connection and comprising an Ether-type field;
performing, by the first PBB device, a lookup of the Ether-type field of the Ethernet frame to determine a match with one or more pre-defined values;
determining, by the first PBB device, that the Ether-type field of the Ethernet frame matches the one or more pre-defined values;
rewriting, by the first PBB device, the Ether-type field of the Ethernet frame to an open value, the open value operable to allow the Ethernet frame to be transmitted to a next hop device;
transmitting, by the first PBB device, the rewritten Ethernet frame to the next hop device; and
performing, by the next hop device, a lookup of the Ether-type field of the rewritten Ethernet frame to determine a next action.

8. The method of claim 7, wherein the first edge router is engaged in a MACsec key exchange with the second edge router.

9. The method of claim 7, wherein rewriting the Ether-type field further comprises rewriting the Ether-type field to a value corresponding to 0x876F.

10. The method of claim 7, wherein the Ether-type field comprises a value corresponding to 0x888e.

11. The method of claim 7, wherein the operation of rewriting the Ether-type field is configured by policy on the first PBB device.

12. The method of claim 7, wherein the rewritten Ether-type field of the Ethernet frame is operable to be modified to its original value at a second PBB device associated with the second edge router.

13. One or more computer-readable non-transitory storage media embodying instructions that, when executed by a processor, cause the performance of operations comprising:
receiving, at a first provider backbone bridge (PBB) device, an Ethernet frame from a first edge router, the Ethernet frame configured for transmission to a second edge router via a Media Access Control security (MACsec) connection and comprising an Ether-type field;
performing, by the first PBB device, a lookup of the Ether-type field of the Ethernet frame to determine a match with one or more pre-defined values;
determining, by the first PBB device, that the Ether-type field of the Ethernet frame matches the one or more pre-defined values;
rewriting, by the first PBB device, the Ether-type field of the Ethernet frame to an open value, the open value operable to allow the Ethernet frame to be transmitted to a next hop device;
transmitting, by the first PBB device, the rewritten Ethernet frame to the next hop device; and
performing, by the next hop device, a lookup of the Ether-type field of the rewritten Ethernet frame to determine a next action.

14. The one or more computer-readable non-transitory storage media of claim 13, wherein the first edge router is engaged in a MACsec key exchange with the second edge router.

15. The one or more computer-readable non-transitory storage media of claim 13, wherein rewriting the Ether-type field further comprises rewriting the Ether-type field to a value corresponding to 0x876F.

16. The one or more computer-readable non-transitory storage media of claim 13, wherein the Ether-type field comprises a value corresponding to 0x888e.

17. The one or more computer-readable non-transitory storage media of claim 13, wherein the operation of rewriting the Ether-type field is configured by policy on the first PBB device.

* * * * *